United States Patent
Hoshino et al.

(10) Patent No.: US 7,859,797 B2
(45) Date of Patent: Dec. 28, 2010

(54) MAGNETORESISTIVE HEAD AND MAGNETIC STORAGE APPARATUS

(75) Inventors: Katsumi Hoshino, Kanagawa (JP); Hiroyuki Hoshiya, Kanagawa (JP); Yasuyuki Okada, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1010 days.

(21) Appl. No.: 11/655,820

(22) Filed: Jan. 18, 2007

(65) Prior Publication Data

US 2007/0188944 A1     Aug. 16, 2007

(30) Foreign Application Priority Data

Jan. 19, 2006   (JP) ............................... 2006-011579

(51) Int. Cl.
*G11B 5/39* (2006.01)
(52) U.S. Cl. ..................................................... 360/319
(58) Field of Classification Search ................... 360/319
See application file for complete search history.

(56) References Cited

U.S. PATENT DOCUMENTS

| | | | |
|---|---|---|---|
| 6,252,749 B1 | 6/2001 | Hayakawa | |
| 6,292,334 B1 * | 9/2001 | Koike et al. | 360/319 |
| 6,515,837 B1 * | 2/2003 | Hamakawa et al. | 360/319 |
| 6,693,774 B2 * | 2/2004 | Watanabe et al. | 360/319 |
| 6,731,474 B2 | 5/2004 | Terunuma et al. | |
| 6,735,058 B2 * | 5/2004 | Lin et al. | 360/319 |
| 6,765,768 B2 | 7/2004 | Saito | |
| 7,342,751 B2 * | 3/2008 | Nagasaka et al. | 360/324.1 |
| 2002/0086182 A1 | 7/2002 | Fujikata et al. | |
| 2003/0206379 A1 | 11/2003 | Lin et al. | |

FOREIGN PATENT DOCUMENTS

| | | |
|---|---|---|
| JP | 04-098608 A | 3/1992 |
| JP | 2002-204002 | 7/2002 |
| JP | 2002-222504 | 8/2002 |
| JP | 2005-191312 A | 7/2005 |
| JP | 2005-347512 A | 12/2005 |

OTHER PUBLICATIONS

Japanese Patent Office, First Office Action in Japanese counterpart to instant application dated Aug. 17, 2010.

* cited by examiner

*Primary Examiner*—Mark Blouin
(74) *Attorney, Agent, or Firm*—GMG Intellectual Property Law; Guadalupe M. Garcia (57) ABSTRACT

Embodiments in accordance with the present invention provide a Current Perpendicular to the Plane—Giant Magnetoresistive (CPP-GMR) head exhibiting a high magnetoresistance (MR) ratio with a low area-resistance product. A lower shield is made up of a first shield layer/a crystalline reset layer/a second shield layer, and an amorphous material is used in at least a part of the crystalline reset layer, thereby controlling crystallinity of the second lower shield/the CPP-GMR head.

18 Claims, 6 Drawing Sheets

MAGNETORESISTIVE HEAD AND MAGNETIC STORAGE APPARATUS

CROSS-REFERENCE TO RELATED APPLICATION

The instant nonprovisional patent application claims priority to Japanese Patent Application No. 2006-011579, filed Jan. 19, 2006 and incorporated by reference for all purposes herein.

BACKGROUND OF THE INVENTION

Embodiments in accordance with the present invention relate to a magnetic head and a magnetic storage apparatus, capable of coping with a high areal recording density.

A giant magnetoresistive (GMR) film called a spin-valve has been in use as material for a read head of a HHD (Hard Disk Drive), as progress toward higher magnetic recording densities advances, enabling a read output to be enhanced up to now due to improvement on film makeup. A film makeup of the spin-valve has a structure comprising an antiferromagnetic layer/a pinned ferromagnetic layer/a non-magnetic intermediate layer/a free ferromagnetic layer. As magnetization of the pinned ferromagnetic layer is pinned by an interlayer coupling field occurring to an interface between the antiferromagnetic layer, and the pinned ferromagnetic layer, and the free ferromagnetic layer undergoes magnetization reversal owing to an external field, so that relative orientations of magnetization of the magnetic layers are changed, and electric resistance undergoes a change, thereby detecting a magnetic field. In this case, current flows in a direction parallel to a film plane of the GMR film. In order to achieve a still higher output, R and D have lately been conducted on a CPP (Current Perpendicular to the Plane)—GMR head for causing current to flow in a direction perpendicular to a film plane of the GMR film, and there have since been disclosed various methods including a method for achieving a higher output by forming an insulating layer inside the spin-valve, a method for achieving a higher output by increasing the number of interfaces between respective stacked layers, and so forth.

[Patent Document 1] JP-A No. 204002/2002
[Patent Document 2] JP-A No. 222504/2002

In the case of the CPP-GMR head, upper and lower shields are directly connected to the GMR film, doubling as an electrode, respectively, so that the upper and lower shields each need to fulfill not only the function of a conventional magnetic shield but also the function of the electrode. Further, with a conventional read head, upper and lower shield layers are separated from the spin-valve, respectively, with the intermediary of an insulating gap layer composed mainly of amorphous, so that crystalline structure of the shields poses no problem, however, in the case of the CPP-GMR head, the spin-valve is formed directly on the lower shield, so that the crystalline structure of the shield comes to exert an influence upon properties of the GMR film. Accordingly, a shield material, and film makeup are very important factors for enhancement in the properties of the CPP-GMR head.

An NiFe base alloy, a FeAlSi base alloy, a Co base amorphous alloy, and so forth are well known as (material for) the shields of a read head. The NiFe base alloy, and the FeAlSi base alloy are crystalline, and if those alloys, as they are, are applied to the CPP-GMR head, the crystallinity thereof will exert a large influence upon the properties of the GMR film. Further, in the case of using the Co base amorphous alloy for the shields, there exist problems such as deterioration in the function of the shields as the electrodes, owing to high resistance of the Co base amorphous alloy, deterioration in heat dissipation properties, and susceptibility to occurrence of read instability attributable to the shields.

A problem with a conventional CPP-GMR head lies in that even if the GMR film is formed on a NiFe shield normally as thick as not less than 1 μm, stable and excellent properties cannot be obtained. With the GMR film of the so-called confined current path type, in particular, there is a tendency that an area-resistance product becomes high while a magnetoresistance (MR) ratio becomes low. If the area-resistance product is high, read head performance at high frequency deteriorates as enhancement in recording density advances, and the GMR film as described is therefore not recommendable for application to the magnetic head. The GMR film exhibiting a high MR ratio at a low area-resistance product is desirable. With the confined current path type CPP-GMR head, use is made of an extremely thin oxidized film having a structure with fine pin holes for causing current to flow locally in the direction of a film thickness. The structure of the extremely thin oxidized film is a major factor for determining the area-resistance product as well as the MR ratio of the CPP-GMR head. As the crystalline structure of the lower shield is considered to have a large effect on the formation of the extremely thin oxidized film, how to control the crystalline structure of the GMR film is important.

BRIEF SUMMARY OF THE INVENTION

Embodiments in accordance with the present invention provide a Current Perpendicular to the Plane-Giant Magnetoresistive (CPP-GMR) head exhibiting a high MR ratio with a low area-resistance product. Referring to the specific embodiment of FIG. 1, a lower shield is made up of a first shield layer 112/a crystalline reset layer/a second shield layer 115, and an amorphous material is used in at least a part of the crystalline reset layer, thereby controlling crystallinity of the second lower shield/the CPP-GMR head.

BRIEF DESCRIPTION OF THE DRAWINGS

FIGS. 4(*a*)-(*b*) are schematic diagrams for describing difference in crystallinity between films making up a magnetic head according to an embodiment of the present invention, and those making up a magnetic head according to a conventional example, respectively.

DETAILED DESCRIPTION OF THE INVENTION

In accordance with embodiments of the present invention, there is provided a CPP type magnetoresistive head comprising a magnetoresistive film comprising at least pinned layers, free layers, and a non-magnetic layer sandwiched between the pinned layers, and the free layers, and an shield doubling as an electrode, provided above and below the magnetoresistive film, respectively, wherein a lower shield has a stacked structure comprising a first lower shield formed on a side thereof, adjacent to a substrate, a crystalline reset layer, and a second lower shield formed on a side thereof, adjacent to the magnetoresistive film, and an amorphous layer is formed in at least a part of the crystalline reset layer. Thus, with the adoption of the stacked structure for the lower shield, where at least the amorphous layer is interposed in the middle of the lower shield, it is possible to fabricate the magnetoresistive film high in output without being affected by crystalline orientation as well as grain size of the lower shield. For the amorphous layer of the crystalline reset layer, use can be made of a non-magnetic material such as AlZr, Hf, Zr, Ti, and so forth, and a Co based magnetic material such as CoNbZr, CoTaHf, and so forth.

Further, with the crystalline reset layer being made up of the amorphous layer, and a crystalline control layer formed on the amorphous layer, it is possible to control crystalline orientation as well as grain size of both the second lower shield, and the GMR film formed thereon, so that the CPP-GMR head exhibiting a high MR ratio with a low area-resistance product can be manufactured.

Further, a high performance magnetic head having a large read output can be obtained by combining the CPP-GMR head according to embodiments of the present invention with an inductive write head, or a perpendicular recording head (single-pole-write head).

According to an embodiment of the present invention, the GMR film of the CPP-GMR is not affected by the crystalline orientation as well as the grain size of the lower shields. Further, if the crystalline reset layer includes the crystalline control layer, it is possible to control the crystalline orientation as well as the grain size of the GMR film. With the CPP-GMR head using the confined current path layer, in particular, it is possible to obtain the magnetoresistive head that is high in the MR ratio with a low area-resistance product.

One embodiment of the present invention is cited hereinafter to be specifically described by referring to a table. (Embodiments of the invention are described hereinafter with reference to the accompanying drawings, and a table.)

Figure 1:
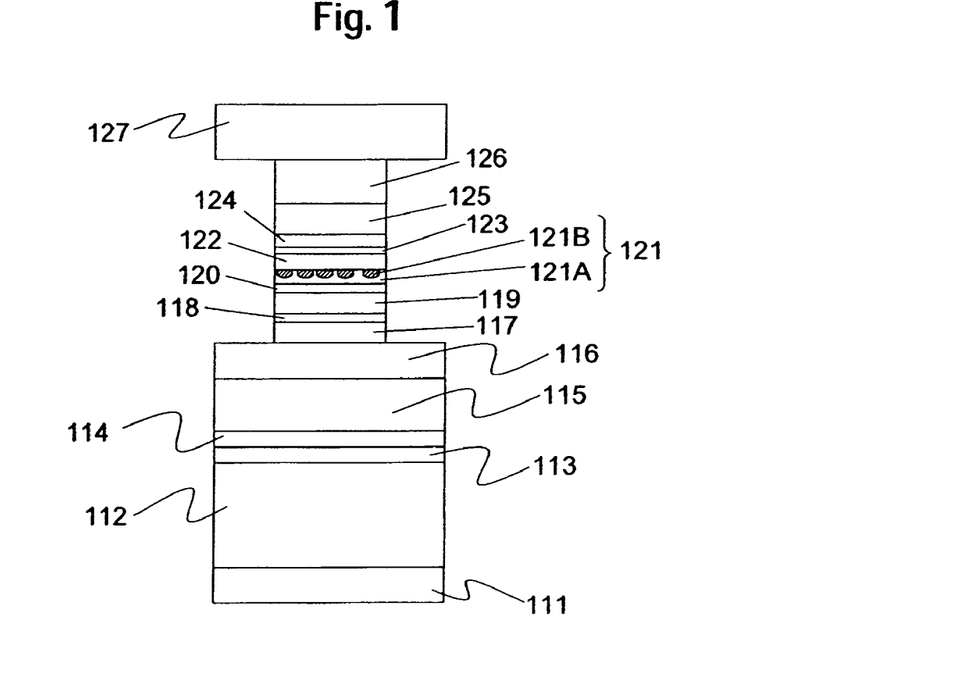
FIG. 1 is a schematic representation showing a shield makeup and GMR film makeup of a test chip for evaluation of CPP-GMR according to an embodiment of the present invention.

FIG. 1 is a schematic diagram showing a test chip for evaluation of magnetoresistive effect, with a GMR film of a confined current path type, formed on a lower shield. In this connection, a process for manufacturing the lower shield is the same as that for a process for manufacturing an actual magnetic head. First, an NiFe film about 1.5 μm thick, as a first shield layer 112 that is a part of the lower shield, is formed by the pattern plating method on a nonmagnetic substrate 111 obtained by forming an insulating layer composed of alumina, followed by precision polishing. The surface of the NiFe film as the first shield layer 112 is subjected to planarization by use of the CMP method. Next, as the surface is oxidized, an oxidized film is first removed by the ion milling method. The NiFe film is transferred to a deposition chamber communicating therewith in a vacuum so as to prevent the film from coming into contact with air, whereupon a crystalline reset layer is formed thereon, and on the top of the crystalline reset layer, there are sequentially formed a second shield layer, and a GMR film.

More specifically, as the crystalline reset layer, there were formed an amorphous layer 113 2 nm in thickness, comprising an AlZr alloy, and an NiFeCr crystalline control layer 114 6 nm in thickness, and on the top of the NiFeCr crystalline control layer 114, an NiFe film 50 nm or 100 nm in thickness was formed as the second shield layer 115. The GMR film formed on the top of the second shield layer was made up as a spin-valve having the following structure. An MnIr film 15 nm in thickness was used as an antiferromagnetic layer 116, and for pinned layers, there was adopted a synthetic ferrimagnetic structure (117/118/119), more specifically, a CoFe film (3 nm)/a Ru film (0.8 nm)/a CoFe film (3 nm). Thereafter, there was formed a Cu layer 120 0.5 nm in thickness, functioning as an oxidation prevention layer for the pinned layers when forming a confined current path layer, and after formation of a CoFe film as the confined current path layer 121, natural oxidation was applied for 1 minute under a pressure at 700 Pa. Subsequently, there were sequentially formed a Cu film (2 nm) as an intermediate layer 122, a CoFe film (1 nm)/an NiFe film (2 nm) as free layers 123/124, respectively, and a Cu film (5 nm)/an Ru film (10 nm) as cap layers 125/126, respectively. Thereafter, in order to obtain an interlayer coupling field of a MnIr antiferromagnetic layer, heat treatment in a magnetic field was applied at 270° C. for 3 hours. After the heat treatment, a CPP-GMR film was patterned to a size as desired by the ion milling method, and subsequently, a Ta film (2 nm)/an Au film (100 nm)/a Ta film (2 nm) were formed as an upper electrode 127 by lift-off process.

Figure 2:
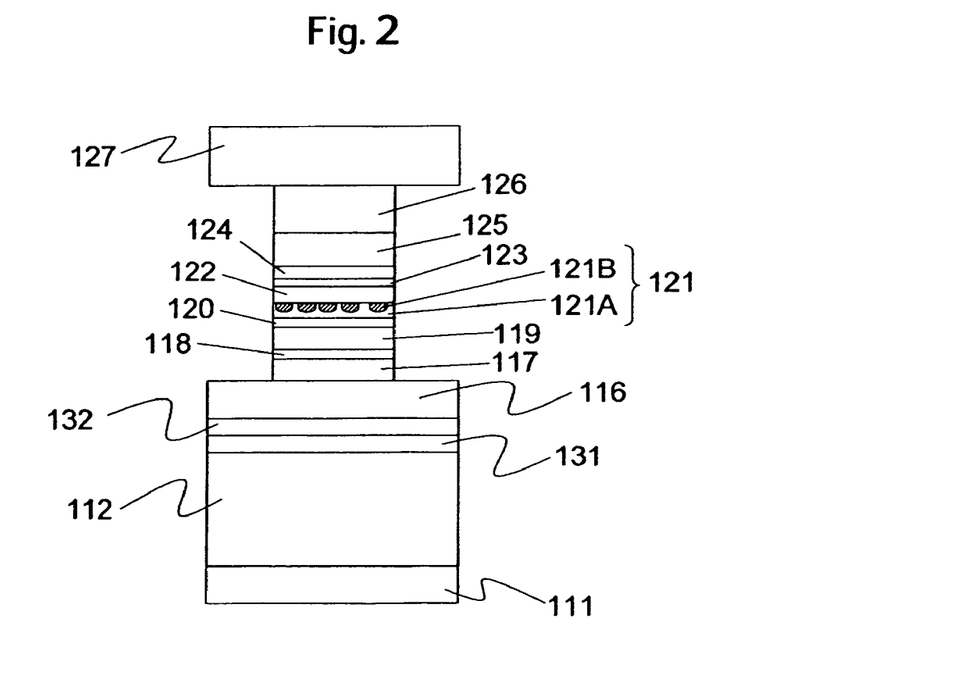
FIG. 2 is a schematic representation showing a shield makeup and GMR film makeup of a test chip for evaluation of conventional CPP-GMR.

As a comparative example, a Ta film (2.5 nm)/an NiFeCr film (6 nm) as two-layer underlayers 131/132, respectively, were formed on a shield 112 as shown in FIG. 2, and there was formed a GMR film identical in structure from an antiferromagnetic layer 116 up to cap layers 125/126 to the GMR film according to the embodiment as described above.

Now, as shown in FIG. 1 and FIG. 2, an oxidized film of the CoFe film is separated into a metallic part (121A) and an oxidized part (121B) due to heat treatment, so that the effect of confined current path is obtained, exhibiting a high MR ratio.

Figure 3:
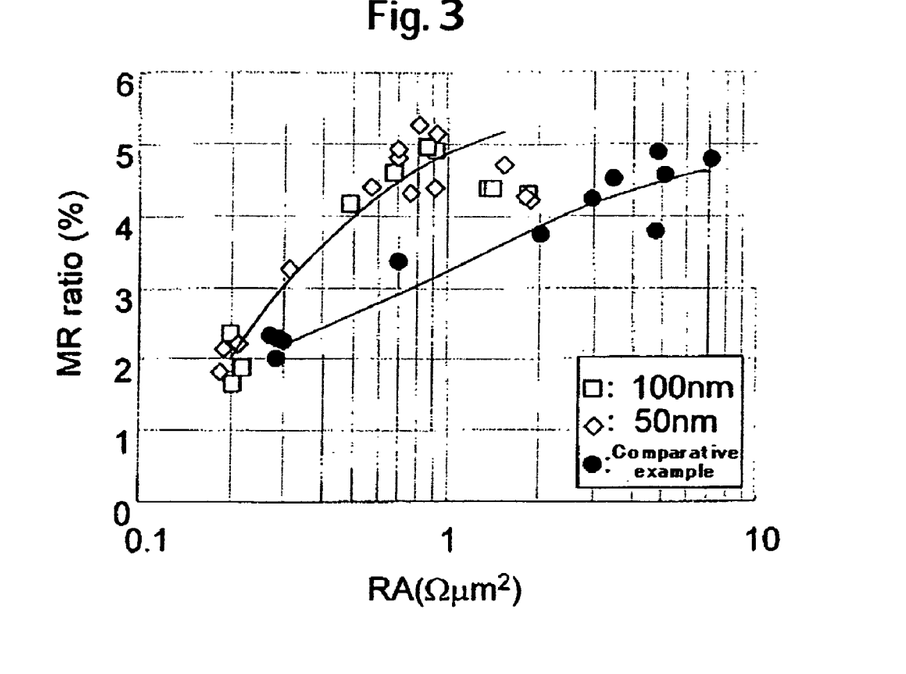
FIG. 3 is a graph showing a relationship between an area-resistance product and a MR ratio with reference to a shield makeup according to an embodiment of the present invention and a conventional shield makeup.

FIG. 3 shows a relationship between an area-resistance product (RA), and a MR ratio with reference to the GMR film when the CoFe film to be oxidized is varied in film thickness. In the figure, hollow squares indicate the case of the second shield 115 being 100 nm in thickness, and hollow rhombuses indicate the case of the second shield 115 being 50 nm in thickness. Further, black circles indicate the case of the comparative example. As shown in the figure, with the comparative example, a high MR ratio is obtained in a region where the area-resistance product is high, however, with the structure according to the invention, a high MR ratio is obtained in a region where the area-resistance product is low. Results of evaluation on grain size of the GMR film showed that in contrast to the comparative example where the grain size was found in a range of 7 to 12 nm, substantially equivalent to grain size of the lower shield, the grain size for the embodiment of the invention was in a range of 10 to 20 nm, larger than that of the lower shield. The area-resistance product of the GMR film is dependent on the grain size thereof, and it is presumed that in the case of the film large in grain size, a high MR ratio was obtained with a low area-resistance product.

Figure 4:
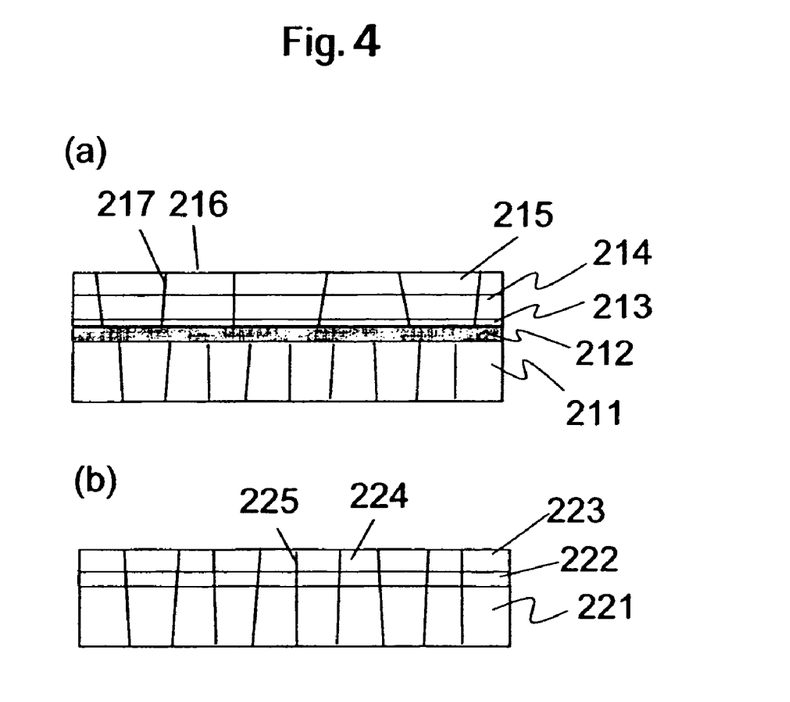

FIGS. 4(a)-(b) are schematic diagrams for describing difference in crystallinity between films making up the magnetic head according to an embodiment of the invention, and those making up a magnetic head according to a conventional example, respectively. As shown in FIG. 4(b), with the conventional example, respective crystal grains 224 of an underlayer film 222, and a GMR film 223 undergo growth according to a grain size of a lower shield 221. Reference numeral 225 denotes a crystal grain boundary. In contrast, as shown in FIG. 4(a), with the structure according to the invention, it is deemed that crystallinity of a lower shield 211 is blocked by an AlZr amorphous layer 212 making up the crystalline reset layer, and respective crystal grains 216 of a second shield layer 214, and a GMR film 215 increased in size through the agency of an NiFeCr crystalline control layer 213. Reference numeral 217 denotes a crystal grain boundary.

With the present embodiment, the crystalline structure of the lower shield was blocked by the amorphous layer of the crystalline reset layer, and the GMR film large in grain size was formed through the agency of the NiFeCr crystalline control layer of the crystalline reset layer, but the grain size can be controlled in magnitude by introducing ingenuity in design of the crystalline control layer. Further, with the present embodiment, use is made of the GMR film with the confined current path layer applied thereto, however, use may be made of a common GMR film without the confined current path layer.

Next, Table 1 shows a relationship between the area-resistance product, and the MR ratio with reference to the GMR film to which an oxidized CoFe film 1.5 nm thick was applied as the confined current path layer, in the case of varying the amorphous layer and the crystalline control layer, making up the crystalline reset layer, in composition. The comparative example had makeup of films, as shown in FIG. 2.

TABLE 1

| Crystalline reset layer (at .%) | Crystalline control layer (at .%) | Area-resistance product ($\Omega\mu m^2$) | MR ratio (%) |
|---|---|---|---|
| Al90-Zr10 (3 nm) | None | 1.1 | 4.2 |
| Al90-Zr10 (3 nm) | (Ni80-Fe20)65-Cr35 (5 nm) | 0.7 | 5.2 |
| Al90-Zr10 (3 nm) | (Ni80-Fe20)85-Cr15 (5 nm) | 1.5 | 4.9 |
| Al90-Zr10 (3 nm) | (Ni80-Fe20)30-Cr70 (5 nm) | 1.7 | 4.5 |
| Al90-Zr10 (3 nm) | (Ni80-Fe20)65-Cr35 (5 nm)/ Cu(5 nm) | 0.5 | 5.2 |
| Al90-Zr10 (3 nm) | (Ni80-Fe20)65-Cr35 (5 nm)/ Ru(5 nm) | 0.9 | 4.7 |
| Al90-Zr10 (3 nm) | (Ni80-Fe20)65-Cr35 (4 nm)/ Ni85-Fe15(2 nm) | 0.7 | 5.0 |
| Ti(2 nm) | None | 0.9 | 4.3 |
| Ti(2 nm) | (Ni80-Fe20)65-Cr35 (5 nm) | 0.6 | 5.3 |
| Hf(2 nm) | (Ni80-Fe20)65-Cr35 (5 nm) | 0.6 | 5.0 |
| Zr(2 nm) | (Ni80-Fe20)65-Cr35 (5 nm) | 0.5 | 5.5 |
| Zr(2 nm) | None | 1.2 | 4.1 |
| Hf50-Zr50 (2 nm) | (Ni80-Fe20)65-Cr35 (5 nm) | 0.5 | 5.8 |
| Hf50-Zr50 (2 nm) | None | 1.5 | 4.3 |
| Hf50-Zr50 (2 nm) | (Ni80-Fe20)65-Cr35 (5 nm) | 0.5 | 5.8 |
| Zr34-Ni64 (2 nm) | (Ni80-Fe20)65-Cr35 (5 nm) | 0.6 | 4.8 |
| Zr34-Cu64 (2 nm) | (Ni80-Fe20)65-Cr35 (5 nm) | 0.5 | 5.8 |
| Ti50-Cr50 (2 nm) | (Ni80-Fe20)65-Cr35 (5 nm) | 1.0 | 4.2 |
| (Comparative example) | Ta(2.5 nm)/ (Ni80-Fe20)65-Cr35(6 nm) | 5.0 | 4.5 |

As shown in Table 1, with the use of an AlZr layer as the amorphous layer 113, a high MR ratio is obtained in a region where the area-resistance product is low. With the present embodiment, the AlZr layer had a composition with 90 at. % Al but if Al content is in a range of 85 to 95%, an AlZr layer will be in amorphous state, and can sufficiently obtain an effect of resetting crystallinity of the lower shield. Further, with the use of an amorphous layer composed of Hf, Zr, Ti, or so forth, besides an AlZr alloy, a similar effect can be obtained. Furthermore, since alloys composed of material with an fcc structure, such as Cu, Ni, and so forth, and elements, such as Hf, Zr, Ti, and so forth, tend to be easily turned into amorphous state, a high MR ratio can be obtained with a low area-resistance product by use of those alloys as the crystalline reset layer. Still further, because material, such as Ta, Nb, V, and so forth, is turned into amorphous state depending on a film-forming method, a layer formed of such material may be deposited under a condition suited for transformation into the amorphous state before being put to use.

Table 1 shows that in the case where use was made of the crystalline reset layer provided with the crystalline control layer, the area-resistance product was decreased, and the MR ratio was found slightly improved as compared with the case where use was made of the crystalline reset layer having the amorphous layer only without the crystalline control layer provided, and it is therefore preferable to form the crystalline control layer. With the present embodiment, NiFeCr alloys were used for the crystalline control layer. If Cr concentration in the NiFeCr alloys is in a range of 30 to 50 at. %, particularly excellent properties can be obtained. It is presumed that this is because the NiFe film as the second shield layer, formed over the crystalline control layer, is probably improved in crystalline orientation, and a grain size is increased. Further, if the NiFeCr alloy has NiFe composition containing not less than about 40 at. % Ni, which is in a region of the fcc structure, excellent properties can be obtained.

With the present embodiment, as the crystalline control layer, use was made of an NiFeCr single layer, or a two-layer film made of the NiFeCr alloy/any selected from the group consisting of Cu, Ru, and NiFe, however, even if use is made of the NiFeCr alloy, and one element selected from the group consisting of Cu, Ru, NiFe, Ir, Au, Ag, Pt, Pd, and Rh, or an alloy thereof, the same effect can be obtained.

Further, with the present embodiment, for the antiferromagnetic layer 116, use was made of a MnIr alloy, however, use may be made of a MnPt alloy or other antiferromagnetic films, in which case, the same effect can be obtained. Still further, with the present embodiment, the CoFe film was used for the confined current path layer, however, even if use is made of an alloy composed mainly of any selected from the group consisting of Co, Ni, Fe, and so forth, the same effect can be obtained. In particular, if at least either of the metallic part and the oxidized part within the confined current path layer is definitely crystalline, the crystalline structure of the confined current path layer can be controlled through the agency of the crystalline control layer according to the invention, so that excellent properties are exhibited.

Figure 5:
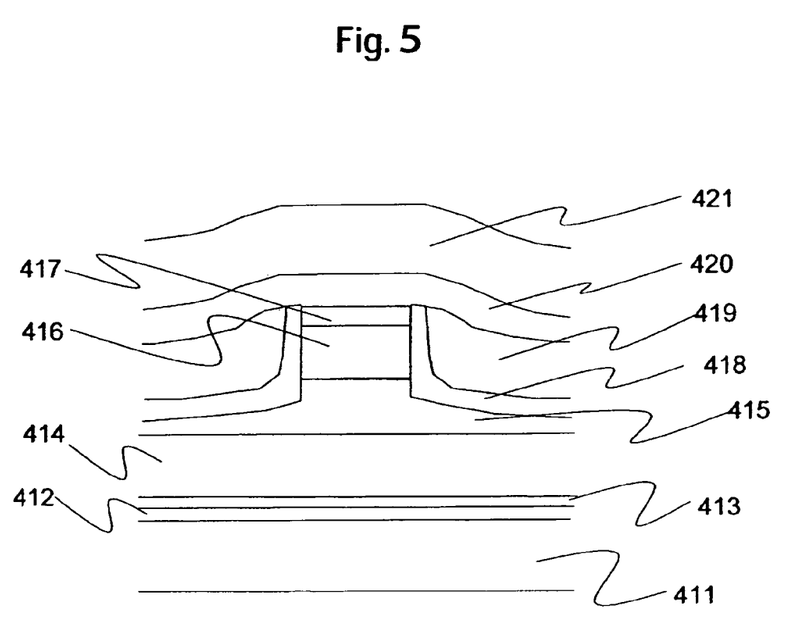
FIG. 5 is a view showing a structure of a magnetoresistive head according to an embodiment of the present invention, as seen from an air bearing surface, by way of example.

A read head (magnetoresistive head) to which embodiments in accordance with the present invention is applied, was manufactured. FIG. 5 is a view showing a magnetoresistive head according to the present embodiment, as seen from an air bearing surface. A process for manufacturing the same is substantially the same as the process for manufacturing the test chip according to the Embodiment 1. First, an NiFe film about 1.5 μm thick, as a first shield layer 411 that is a part of a lower shield, is formed by the pattern plating method on a nonmagnetic substrate obtained by forming an insulating layer composed of alumina followed by precision polishing. The surface of the NiFe film as the first shield layer is subjected to planarization by use of the CMP method. As the surface is oxidized, an oxidized film is first removed by the ion milling method. The first shield layer 411, as it is, is transferred to a deposition chamber communicating therewith in a vacuum so as to prevent the film from coming into contact with air, and on the top of the first shield layer 411, there were sequentially formed an AlZr amorphous layer 2 nm in thickness, as an amorphous layer 412 constituting part of the crystalline reset layer, a crystalline control layer 413 made up of an NiFeCr film 4 nm in thickness, an NiFe film 100 nm in thickness as a second shield layer 414, and a GMR film.

For the GMR film, a spin-valve structure was adopted, using a MnPt film 15 nm in thickness as an antiferromagnetic layer 415, and adopting a synthetic ferri-magnetic pinned layer of a CoFe film (3 nm)/an Ru film (0.8 nm)/a CoFe film (3 nm), as the makeup of a functional part 416 of the spin-valve, from a pinned layer up to a free layer. After forming a Cu layer 0.5 nm in thickness, functioning as an oxide prevention layer for the pinned layer when forming a confined current path layer, and forming a CoFe film 1.5 nm in thickness as confined current path layer, natural oxidation was applied for 1 minute under a pressure at 700 Pa. Subsequently, there were sequentially formed a Cu film (2 nm) as an intermediate layer, a CoFe film (1 nm)/a NiFe film (2 nm) as free layers, respectively. As a cap layer 417, a Cu film (2 nm)/a Ru film (8 nm)/a Ta film (2 nm) were formed. With a workpiece as it is, the second shield layer 414 was in a state as deposited over the entire surface of the substrate, and accordingly, patterning was applied thereto by use of photolithography/ion milling. After completion of the patterning on the second shield layer 414, the GMR film was patterned to a predetermined shape by the ion milling method. With the present embodiment, a track width was set to 70 nm. Thereafter, an alumina film 418 as an insulator for preventing conduction between an upper electrode, and the lower electrode, that is, between electrodes, and a CoCrPt film 419 for magnetic domain control of the free layers in the GMR film were formed at both sides of the GMR film. Then, after removal of an oxidized film on the surface of the GMR film by ion milling, an electrically conductive gap layer 420 composed of Ta, Cr, Rh, and so forth, for adjustment of a gap length of the read head, and an NiFe plated film 3 μm in thickness as an upper electrode 421 were formed on the top of the GMR film.

Figure 6:
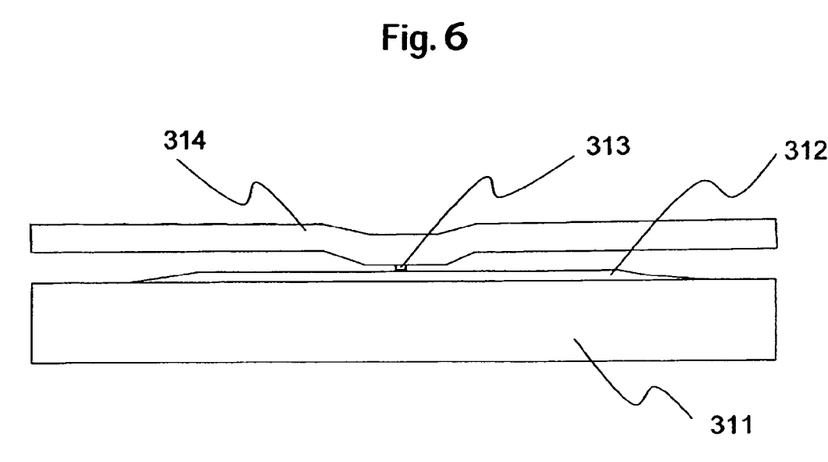
FIG. 6 is a schematic diagram showing the magnetoresistive head according to an embodiment of the present invention, as seen at low magnification from the air bearing surface.

FIG. 6 is a schematic diagram showing the magnetoresistive head according to the present invention, as seen at lower magnification from the air bearing surface. A GMR film 313 as the functional part of the spin-valve is disposed in such a way as to be sandwiched between the lower shield comprising a first shield 311, and a second shield 312, and the upper shield 314. As shown in the figure, the second shield 312 is shorter in length than the first shield 311, corresponding to a range longer than the track width of the GMR film.

The area-resistance product, and the MR ratio of the GMR film were found at 0.7 Ωμm², and 5.4%, respectively, indicating values substantially equivalent to those for the test chip as evaluated with reference to Embodiment 1.

Figure 7:
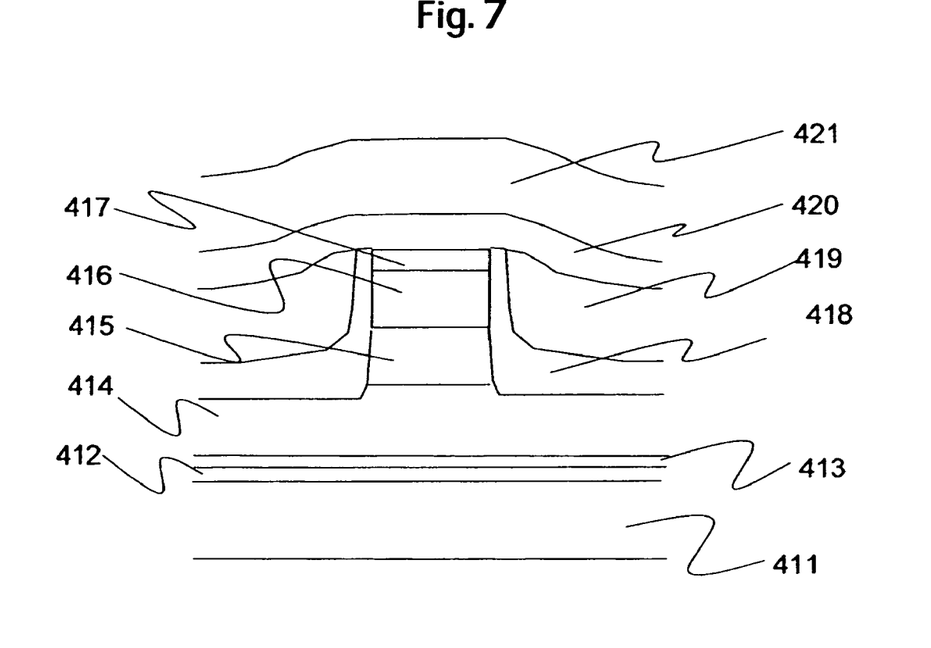
FIG. 7 is a view showing another structure of the magnetoresistive head according to an embodiment of the present invention, as seen from the air bearing surface, by way of example.

FIG. 7 shows another structure of the head according to an embodiment of the invention by way of example. In FIG. 5, the antiferromagnetic layer is in a state where portions thereof are left out on a flat surface of the second shield layer 414, however, as shown in FIG. 7, the portions thereof may be shaved away by ion milling. Further, even if the portions of the second shield layer 414 are shaved away, this will not have a major effect on read resolution.

Figure 8:
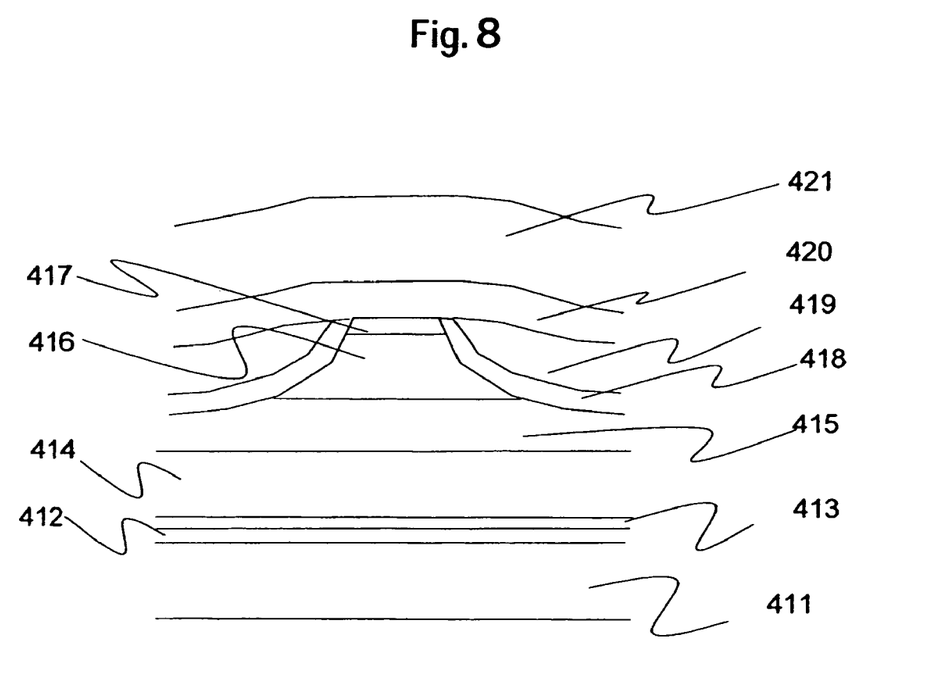
FIG. 8 is a view showing still another structure of the magnetoresistive head according to an embodiment of the present invention, as seen from the air bearing surface, by way of example.

FIG. 8 shows still another structure of the head according to an embodiment of the invention by way of example. As shown in FIG. 8, the GMR film may not be steep at both edges thereof. However, the structure shown in FIG. 8 has a problem in that it is difficult to precisely fix the track width upon enhancement in recording density because the edges of an element are slanted.

With the present embodiment, the NiFe film 100 nm in thickness was adopted as the second shield layer 414, but if the NiFe film is excessively large in thickness, crystalline structure thereof deteriorates, and asperities of the film becomes larger, as that the NiFe film not more than 100 nm in thickness is preferable. However, in the case where a film thickness required of the lower shield will become on the order of several hundred nm in the future due to enhancement in recording density, the first shield layer 411 according to the invention will be unnecessary, and formation of layers from the shield up to the GMR film may be carried out in one operation, starting from the formation of the amorphous layer 412, or the crystalline control layer 413, serving as the crystalline reset layer, directly on the substrate covered with alumina.

A test chip for evaluation of the CPP-GMR was manufactured by the same method as was used in the case of Embodiment 1 above. The present embodiment represents a case where the amorphous layer is made up of a magnetic layer. Table 2 shows a relationship between the area-resistance product, and the MR ratio when the makeup of the crystalline reset layer was changed.

TABLE 2

| Amorphous layer (at .%) | Crystalline control layer (at .%) | Area-resistance product (Ωμm²) | MR ratio (%) |
|---|---|---|---|
| Co84-Nb11-Zr5 (10 nm) | (Ni80-Fe20)65-Cr35 (5 nm) | 0.9 | 4.8 |
| Co84-Nb11-Zr5 (10 nm) | (Ni80-Fe20)65-Cr35 (5 nm)/ Cu(5 nm) | 0.8 | 4.7 |
| Co84-Nb11-Zr5 (10 nm) | (Ni80-Fe20)65-Cr35 (5 nm)/ Ru(5 nm) | 0.9 | 4.9 |
| Co84-Nb11-Zr5 (10 nm) | (Ni80-Fe20)65-Cr35 (5 nm)/ Ni80-Fe20(5 nm) | 0.7 | 5.1 |
| Co84-Nb11-Zr5 (10 nm) | (Ni80-Fe20)65-Cr35 (5 nm)/ Ir(5 nm) | 1.0 | 4.6 |
| Co84-Nb11-Zr5 (10 nm) | None | 1.8 | 4.2 |
| Co87-Ta9-Hf4 (5 nm) | (Ni80-Fe20)65-Cr35 (5 nm) | 0.8 | 5.1 |
| Co87-Ta9-Hf4 (5 nm) | None | 1.4 | 4.7 |
| Co83-Mo12-Zr5 (5 nm) | (Ni80-Fe20)65-Cr35 (5 nm) | 0.7 | 4.9 |
| Co83-Mo12-Zr5 (5 nm) | None | 1.1 | 5.0 |
| Co85-Fe9-B6 (5 nm) | (Ni80-Fe20)65-Cr35 (5 nm) | 0.7 | 5.2 |

As shown in Table 2, even if a Co-based magnetic material is used for the amorphous layer constituting a part of the crystalline reset layer, the area-resistance product was found on a slightly higher side in comparison with that for Embodiment 1 above, however, a high MR ratio was obtained in a region where the area-resistance product was low. In the case of using a thick magnetic amorphous layer for the amorphous layer, there arises a problem of read instability, and if the amorphous layer becomes not less than 50 nm in thickness, the same becomes prone to cause read instability, so that a thickness thereof is preferably rendered as small as possible. In the case of using the Co-based magnetic material as with the case of the present embodiment, a high MR ratio was obtained with a low area-resistance product in a region of a relatively small thickness in a range of 5 to 10 nm, so that it is deemed that the instability poses no major problem.

Further, with the present embodiment, since a slightly low area-resistance product, and a high MR ratio were obtained with the adoption of the crystalline control layer as compared with the case where the crystalline control layer does not exist, the crystalline control layer is preferably adopted.

Still further, with the present embodiment, for the crystalline control layer, use was made of the NiFeCr single layer, or the two-layer film made of the NiFeCr alloy/Cu, Ru, NiFe, or Ir, however, even if use is made of the NiFeCr alloy, and any selected from the group consisting of Cu, Ru, NiFe, Ir, Au, Ag, Pt, Pd, and Rh, or an alloy thereof, the same effect can be obtained.

Figure 9:
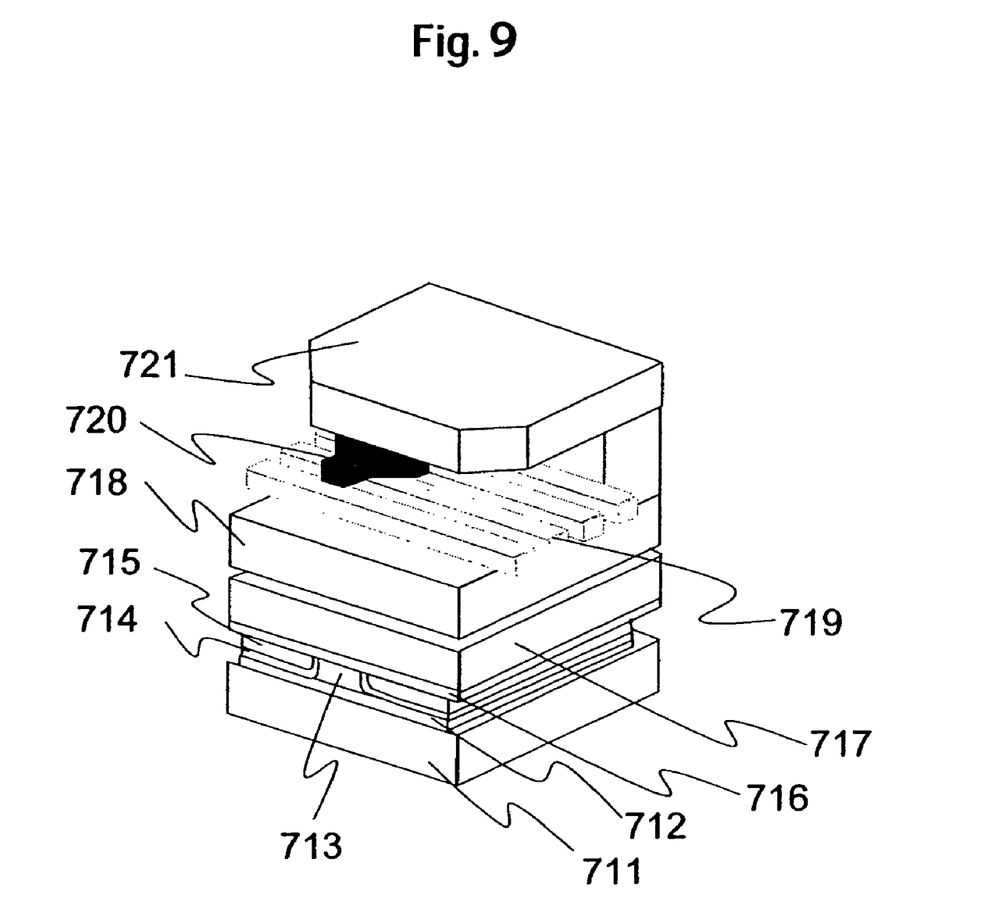
FIG. 9 is a conceptual view of a magnetic head composed of perpendicular magnetic recording head and reproducing head.

FIG. 9 is a conceptual view of a magnetic head comprising a perpendicular magnetic recording head and reproducing head with a magnetoresistive element mounted therein. The reproducing head comprises a lower first shield layer 711 formed on a substrate, doubling as a slider, a second shield layer 712, a GMR film 713, an insulation gap film 714, a magnetic domain control film 715, an electrically conductive gap layer 716. In the figure, a crystalline reset layer (an amorphous layer, crystalline control layer) formed between the first shield layer, and the second shield layer is omitted. A perpendicular recording head (single-pole-type head) comprising a return pole 718, a coil 719, a main pole 720, and yoke 721 is formed on the upper side of the read head.

A magnetoresistive read head according to an embodiment of the present invention can be combined with the perpendicular recording head as well as a longitudinal recording head. However, the magnetoresistive read head combined with the perpendicular recording head can exhibit more effective function.

Figure 10:
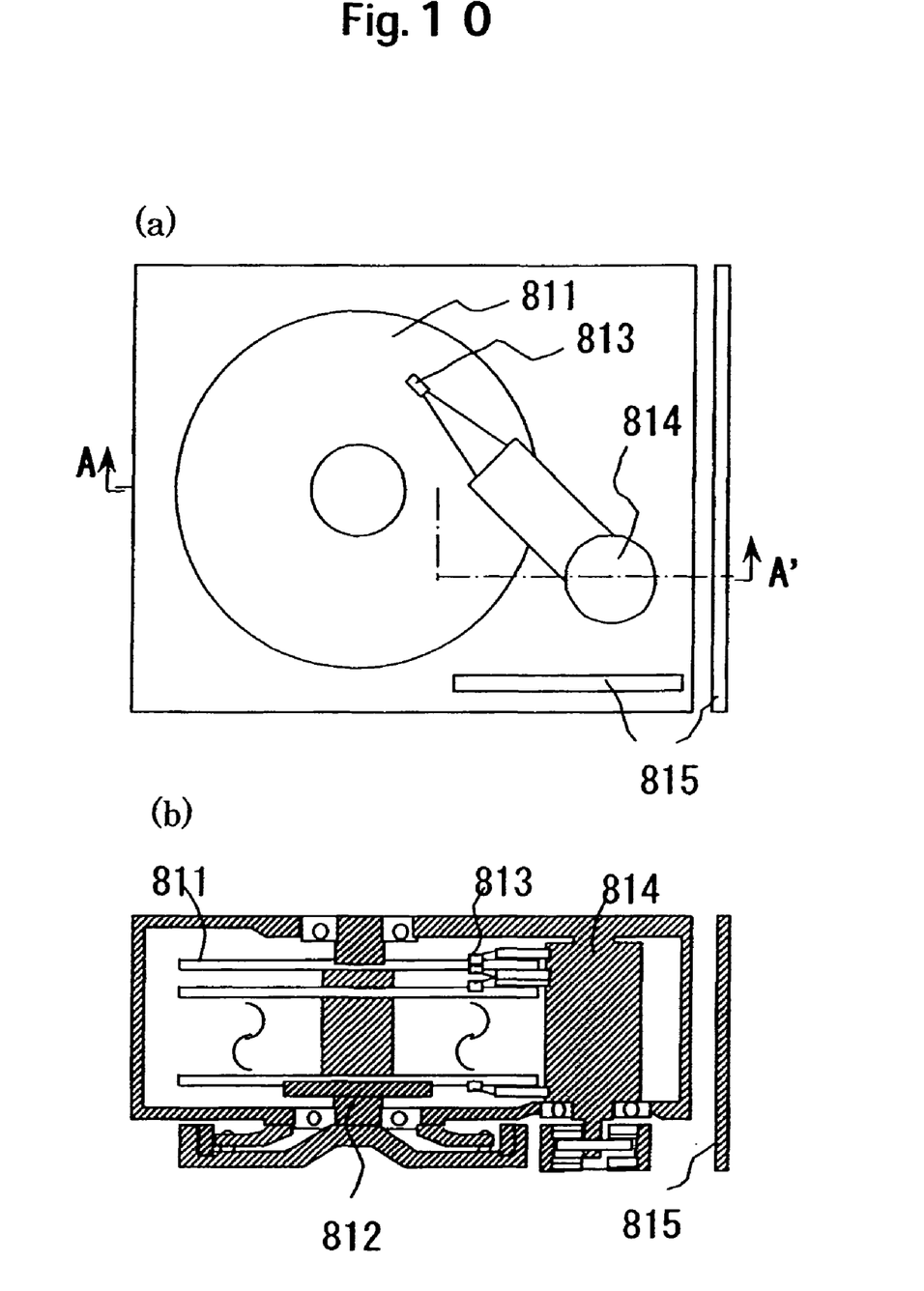
FIG. 10 is a conceptual view of a hard disk drive.

A hard disk drive using the magnetic head composed of perpendicular magnetic recording and reproducing head, fabricated according to an Embodiment 4, was manufactured. FIG. 10 is a schematic illustration of the hard disk drive, in which FIG. 10A is a plan schematic diagram, and FIG. 10B is a sectional schematic diagram taken on line A-A' in FIG. 10A.

For a magnetic disk 811, use was made of a granular medium for perpendicular recording, composed of CoCrPt, and SiO2. For a magnetic head 813, use was made of the magnetic head as described with reference to Embodiment 4. The magnetic disk 811 for magnetically recording information is rotated by a spindle motor 812, and the magnetic head 813 is guided onto a track of the magnetic disk 811 by an actuator 814. That is, with the hard disk drive, the reproducing head, and the recording head, formed on the magnetic head 813, come in close proximity to a predetermined position on the magnetic disk 811 by this mechanism so as to make relative movement by this mechanism, thereby sequentially writing and reading a signal. A recording signal is recorded on the magnetic disk 811 by the recording head via a signal processing system 815, and an output of the reproducing head is obtained as a signal via signal processing system 815.

The magnetic head according to an embodiment of the invention, and a magnetic storage apparatus with the same mounted therein were tested with reference to the structures described in the foregoing, and as a result, sufficient output and excellent bias characteristics were exhibited, and operational reliability was found excellent. The reason for this is that even with the CPP-GMR head having the GMR film of the confined current path type, formed on the lower shield, a high MR ratio can be obtained with a low area-resistance product because the crystalline reset layer according to the invention is applied thereto.

What is claimed is:

1. A magnetic head comprising:
   a substrate;
   a lower shield formed above said substrate;
   a magnetoresistive film formed above said lower shield, said magnetoresistive film including:
   pinned layers;
   a non-magnetic layer; and
   free layers; and
   an upper shield formed above said magnetoresistive film, current flowing between said lower shield and said upper shield, wherein said lower shield has a stacked structure comprising a first lower shield formed on a side thereof, adjacent to said substrate, a crystalline reset layer, and a second lower shield formed on a side thereof, adjacent to said magnetoresistive film, said crystalline reset layer comprising an amorphous layer,
   wherein said amorphous layer is composed of
   an AlZr alloy, or
   one element selected from the group consisting of Hf or Zr, or
   an alloy containing the Hf or Zr as the main constituent thereof.

2. The magnetic head according to claim 1, wherein said magnetoresistive film comprises a confined current path layer made of a mixture composed of metal and an oxide thereof.

3. The magnetic head according to claim 1, wherein said amorphous layer is non-magnetic.

4. The magnetic head according to claim 1, wherein said amorphous layer is magnetic.

5. The magnetic head according claim 1, wherein said crystalline reset layer comprises a crystalline control layer formed above said amorphous layer.

6. The magnetic head according to claim 5, wherein said crystalline control layer is made up of an NiFeCr alloy film, or a stacked film of the NiFeCr alloy film/a film of one element selected from the group consisting of Cu, Au, Ag, Pt, Pd, Ru, Ir, and Rh, or a film of an alloy containing the one element as the main constituent thereof.

7. The magnetic head according to claim 1, wherein said lower shield and said upper shield each double as an electrode.

8. A method of manufacturing a magnetic head comprising the steps of:
   forming a crystalline reset layer above a substrate;
   forming a bottom shield above said crystalline reset layer;
   forming a magnetoresistive film above said bottom shield; and
   forming an upper shield above said magnetoresistive film, wherein during said forming of said crystalline reset layer to said forming of said magnetoresistive film the process is maintained in vacuum condition.

9. A method of manufacturing a magnetic head comprising the steps of:
   forming a first shield as a part of a lower shield on a substrate;
   planarizing a surface of said first shield;
   forming a crystalline reset layer above the top of said first shield;
   forming a second shield above the top of said crystalline reset layer;
   forming a magnetoresistive film above said second shield; and
   forming an upper shield above said magnetoresistive film, wherein a manufacturing process is executed in a vacuum chamber while maintaining a high degree of vacuum from the step of forming said crystalline reset layer up to the step of forming said magnetoresistive film.

10. The method of manufacturing a magnetic head according to claim 9, wherein at least a part of said crystalline reset layer is made up of an amorphous layer, and said amorphous layer is composed of an AlZr alloy, one element selected from the group consisting of Hf, Zr, and Ti, an alloy containing the one element as the main constituent thereof, or a magnetic alloy containing Co as the main constituent thereof.

11. The method of manufacturing a magnetic head according to claim 9, wherein the step of forming said magnetoresistive film includes the sub-step of forming a confined current path layer made of a mixture composed of metal and an oxide thereof.

12. The method of manufacturing a magnetic head according to claim 9, wherein said crystalline reset layer comprises an amorphous layer and a crystalline control layer, and there is provided the step of forming said crystalline control layer after the step of forming said amorphous layer.

13. The method of manufacturing a magnetic head according to claim 12, wherein said crystalline control layer is made up of an NiFeCr alloy film, or a stacked film of the NiFeCr alloy film/a film of one element selected from the group consisting of Cu, Au, Ag, Pt, Pd, Ru, Ir, and Rh, or a film of an alloy containing the one element as the main constituent thereof.

14. The method of manufacturing a magnetic head according to claim 8, wherein said forming of said crystalline reset layer comprises steps of forming an amorphous layer and forming a crystalline control layer above said amorphous layer.

15. A magnetic head comprising:
a substrate;
a crystalline reset layer formed above said substrate;
a bottom shield formed above said crystalline reset layer;
a magnetoresistive film formed above said bottom shield, said magnetoresistive film includes a pinned layer, a non-magnetic layer, and free layer; and
an upper shield formed above said magnetoresistive film, current flowing between said bottom shield and said upper shield,
wherein said magnetoresistive film and said bottom shield has a direct contact,
wherein said crystalline reset layer includes an amorphous layer and a crystalline control layer formed above said amorphous layer, and controls crystalline orientation of said bottom layer and said magnetoresistive film,
wherein said amorphous layer is composed of
an AlZr alloy, or
one element selected from the group consisting of Hf or Zr, or
an alloy containing the Hf or Zr as the main constituent thereof.

16. The magnetic head according to claim 15, wherein a thickness of said bottom shield is 100 nm or less, and said bottom shield is made of NiFe.

17. The magnetic head according to claim 15, wherein said crystalline control layer is made of an NiFeCr alloy film, or a stacked film of the NiFeCr alloy film/ a film of one element selected from the group consisting of Cu, Au, Ag, Pt, Pd, Ru, Ir, and Rh, or a film of an alloy containing the one element as the main constituent thereof.

18. The magnetic head according to claim 15, wherein said crystalline control layer is made of an NiFeCr alloy film, and concentration of Cr is 30~50 at. %.

* * * * *